(12) United States Patent
Ravindran et al.

(10) Patent No.: US 8,189,481 B2
(45) Date of Patent: May 29, 2012

(54) QOS-BASED ROUTING FOR CE-BASED VPN

(75) Inventors: Ravi Ravindran, Ottawa (CA); Donald Fedyk, Groton, MA (US); Lakshminath Dondeti, San Diego, CA (US); Hong Zhang, Kanata (CA)

(73) Assignee: Avaya, Inc, Basking Ridge, NJ (US)

( * ) Notice: Subject to any disclaimer, the term of this patent is extended or adjusted under 35 U.S.C. 154(b) by 170 days.

(21) Appl. No.: 11/400,755

(22) Filed: Apr. 7, 2006

(65) Prior Publication Data

US 2006/0245363 A1     Nov. 2, 2006

Related U.S. Application Data

(60) Provisional application No. 60/669,625, filed on Apr. 8, 2005.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl. ..................................... 370/238
(58) Field of Classification Search .................. 370/238, 370/351, 392
See application file for complete search history.

(56) References Cited

U.S. PATENT DOCUMENTS

| | | | |
|---|---|---|---|
| 7,509,491 B1 * | 3/2009 | Wainner et al. ................ | 713/163 |
| 2002/0150041 A1 * | 10/2002 | Reinshmidt et al. ........... | 370/216 |
| 2003/0018754 A1 * | 1/2003 | Mugica et al. ................. | 709/220 |
| 2003/0112755 A1 * | 6/2003 | McDysan ....................... | 370/230 |
| 2003/0115480 A1 * | 6/2003 | McDysan ....................... | 713/201 |
| 2003/0177221 A1 | 9/2003 | Ould-Brahim et al. | |
| 2004/0117653 A1 | 6/2004 | Shapira et al. | |
| 2004/0168088 A1 * | 8/2004 | Guo et al. ...................... | 713/201 |
| 2005/0044262 A1 * | 2/2005 | Luo ................................. | 709/238 |
| 2005/0063411 A1 | 3/2005 | Wang et al. | |
| 2005/0088977 A1 | 4/2005 | Roch et al. | |

(Continued)

OTHER PUBLICATIONS

A. Nagarajan, Ed., "RFC 3809, Generic Requirements for Provider Provisioned Virtual Private Networks (PPVPN)," Jun. 2004, IETF.*

(Continued)

*Primary Examiner* — Jae Y Lee
(74) *Attorney, Agent, or Firm* — Chapin IP Law, LLC; David W. Rouille

(57) ABSTRACT

CE devices of the present invention are enabled to make more judicious routing decisions in CE-based VPNs. In determining a next-hop in a path from a source CE to a destination subnet, CE-to-CE costs are associated with each next-hop CE in a plurality of next-hop CEs. Each CE-to-CE cost is a cost of a path from the source CE to the associated next-hop CE. CE-to-subnet costs are associated with each of the next-hop CEs. Each CE-to-subnet cost is a cost of a path from the associated next-hop CE to the destination subnet. Total-costs are associated with each of the next-hop CEs. Each total-cost is a sum of a CE-to-CE cost associated with a next-hop CE and a CE-to-subnet cost associated with the same next-hop CE. The next-hop in the path is set to be a next-hop CE associated with an associated total-cost.

19 Claims, 1 Drawing Sheet

U.S. PATENT DOCUMENTS

2006/0059370 A1    3/2006  Asnis et al.
2006/0171331 A1*   8/2006  Previdi et al. .................. 370/254
2006/0215577 A1*   9/2006  Guichard et al. ............. 370/254

OTHER PUBLICATIONS

Hamid Ould-Brahim et al., "Using BGP as an Auto-Discovery Mechanism for Layer-3 and Layer-2 VPNs, draft-ietf-13vpn-bgpvpn-auto-05.txt", Feb. 2005, IETF.*

Bates, T. et al.; "Multiprotocol Extensions for BGP-4"; http://rfc.net/rfc2858.html; 12 pages.

Rosen, E. et al.; "BGP/MPLS VPNs"; http://rfc.net/rfc2547.html; 26 pages.

Chuah, Chen-Nee et al.; "Measuring I-BGP Updates and Their Impact on Traffic"; Sprint ATL Technical Report TR02-ATL-051099; 6 pages.

* cited by examiner

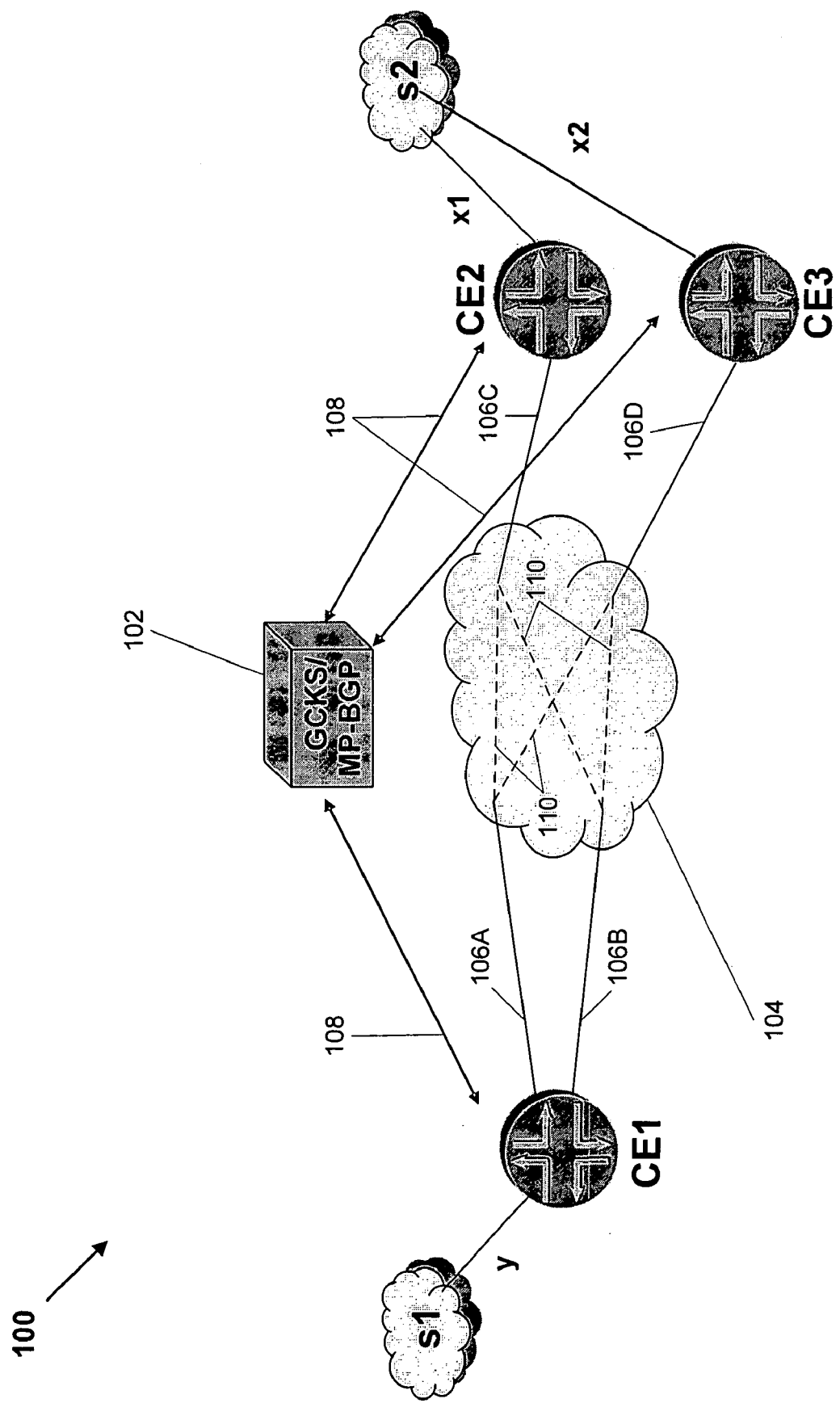

QOS-BASED ROUTING FOR CE-BASED VPN

This application claims the benefit of the filing date of U.S. Provisional Application No. 60/669,625; filed Apr. 8, 2005; entitled "QoS Routing in CE Based VPN;" the entirety of which provisional application is incorporated herein by reference.

FIELD OF THE INVENTION

The present invention relates generally to routing in Virtual Private Networks ("VPNs"). More particularly, the present invention relates to enabling customer edge ("CE") devices to make more judicious routing decisions with respect to a CE-based VPN which employs a GCKS server for secure data interconnection.

BACKGROUND OF THE INVENTION

In the modern telecommunications network space, the use of Virtual Private Networks (VPNs) has become increasingly popular as a means enabling cost-effective voice and data communications between remote sites. In general, a VPN is a private data communications network over-laid on a public Internet Protocol (IP) network (e.g. the internet) for connecting corporate data centers, remote offices, mobile employees, telecommuters, customers, suppliers, and business partners. Data transport between remote sites of the VPN is routed through channels which are set up through the public IP network using any of the Point-to-Point Protocol (PPP), Internet Protocol Security (IPSec), Layer 2 forwarding (L2F), and Layer 2 Tunneling Protocol (L2TP) protocols to ensure reliable performance and data security. Under most of these protocols, the data channels supported for use in conveying VPN traffic are referred to as tunnels.

In general, a tunnel encapsulates IP traffic of a communications session within an outer IP header as it passes through the tunnel, and includes: an ingress node at which traffic enters the tunnel and is encapsulated by the addition of the outer IP header; an egress node, where traffic exits the tunnel and is decapsulated by the removal of the outer IP header; and intermediate nodes through which tunneled traffic passes between the ingress and egress. In a VPN environment, the ingress and egress nodes serve as endpoints of an end-to-end communications path, and may correspond to customer premised equipment and/or network-based access equipment provided by a network service provider. One commonly utilized method of establishing network VPN tunnels is described in Internet Engineering Task Force ("IETF") Request For Comments ("RFC") 2547, the content of which is hereby incorporated herein by reference.

The encapsulation of IP traffic enables various routing and security features, and is a defining characteristic of IP tunnels. IP tunnels are considered to be unidirectional. Bi-directional data transport between two sites on a VPN is achieved by means of two unidirectional tunnels carrying traffic in opposite directions between the two sites.

IP traffic of a communications session through a tunnel retains its original IP header, while an outer IP header is attached and detached at tunnel endpoints. In general, the intermediate nodes between the tunnel endpoints operate solely on the outer IP header, and hence the per-hop-behavior (PHB) of the tunnel is determined by the contents of the Differentiated Services Code Point (DSCP) field of the outer IP header. The contents of this field are normally negotiated as part of the tunnel set-up procedure, typically by copying the DSCP field contents of the inner IP header. Once the DSCP field content of the outer IP header has been negotiated, it remains fixed for the life of the tunnel. In this manner, some Quality of Service ("QoS") guarantees are provided by classifying traffic into various classes and employing differentiated packet dropping schemes to achieve the target packet loss. However, these DSCP mechanisms (also, referred to as DiffServ mechanisms) are generally ignorant about any topology changes.

SUMMARY OF THE INVENTION

CE devices of the present invention are enabled to make more judicious routing decisions in CE-based VPNs. In determining a next-hop in a path from a source CE to a destination subnet, CE-to-CE costs are associated with each next-hop CE in a plurality of next-hop CEs. Each CE-to-CE cost is a cost of a path from the source CE to the associated next-hop CE. CE-to-subnet costs are associated with each of the next-hop CEs. Each CE-to-subnet cost is a cost of a path from the associated next-hop CE to the destination subnet. Total-costs are associated with each of the next-hop CEs. Each total-cost is a sum of a CE-to-CE cost associated with a next-hop CE and a CE-to-subnet cost associated with the same next-hop CE. The next-hop in the path is set to be a next-hop CE associated with an associated total-cost. In a first preferred embodiment, the next-hop is a next-hop CE associated with the least of all associated total-costs. In this embodiment, the chosen next-hop provides a minimal-cost path from the source CE to the destination subnet. In a second preferred embodiment, auto-discovery provided via MP-BGP is used to determine CE-to-subnet costs.

BRIEF DESCRIPTION OF THE DRAWINGS

The above and further advantages of this invention may be better understood by referring to the following description in conjunction with the accompanying drawing(s), in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 1 illustrates a CE-based VPN in accordance with the present invention.

DETAILED DESCRIPTION OF THE INVENTION

As is generally known in the art, a CE-based VPN is a VPN approach in which a shared service provider ("SP") network does not have any knowledge of the customer VPN. This information is limited to CE devices. All the VPN-specific procedures are performed in the CE devices, and the service provider's devices are not aware in any way that some of the traffic they are processing is VPN traffic. As is understood in the art, CE devices may include any of a variety of networked devices, such as routers, personal computers, laptops, workstations, and the like.

The present invention allows CE devices in a CE-based VPN to make more judicious routing decisions and route along paths of minimal cost. QoS routing is provided that can be applied in a CE-based VPN irrespective of whether a CE device is DiffServ-capable or not. That is, the present invention does not affect underlying DiffServ capabilities. Cost herein is assumed to be any parameter that has additive property. That is, the total cost of a path is the sum of the cost metric along the links of that path. This cost metric could represent any QoS metric based on the traffic-engineering objective. A common metric that is employed by default is the hop count. To enable real-time applications, the metric may be a more resource aware metric, such as delay or bandwidth. Thus, the present invention is particularly advantageous for applications requiring more stringent QoS guarantees.

FIG. 1 illustrates an embodiment of a CE-based VPN 100 according to the present invention. FIG. 1 shows three CE devices (i.e., CE1, CE2, and CE3) belonging to the CE-based VPN 100. The CE-based VPN 100 also includes two subnets (i.e., s1 and s2). The CE-based VPN 100 uses Group Security Association ("GSA") for site-to-site communications that are scalable and secure. Thus, instead of point-to-point Security Association ("SA") establishment, the CE-based VPN 100 establishes a secure key management channel and a secure control channel 108 with a server 102—referred to herein as a group controller/key server ("GCKS")—and a single IPSec SA for all site-to-site communication.

Each CE device is located at the edge of the customer site that has IP connectivity with an SP's device. A CE device can be associated with one or more VPNs. There is a unique GSA per VPN. It should be noted that there are no CE-to-CE SAs corresponding to each CE-to-CE VPN tunnel, instead all CE-to-CE VPN traffic is encapsulated using a single GSA for IPSec processing. Each CE device maintains one or more VPN-tunnel endpoints. That is, CEs are connected via IPSec tunnels over an SP network (typically, the Internet). The IPSec tunnels provide CE-to-CE or site-to-site security. In this manner, each CE device includes one or more protected data channels 106. These are tunnels in the sense of providing an encapsulation/decapsulation at the ingress/egress ends of the tunnels. Because these tunnels have site-to-site security and have no point-to-point security association, these tunnels lack the properties to support traditional routing protocols, such as OSPF and RIP, for example. The present invention provides QoS routing in these CE-based VPNs. While traditional CE-VPN implementations provide quality routing, they have drawbacks of scalability with respect to security overhead. CE-based VPNs of the present invention, on the other hand, provide both scalability and QoS routing.

A GCKS is a customer device in the network that creates GSAs with other CE devices. The GCKS could be a CE with or without VPN connectivity. For scalability and high-availability reasons, there is a preference for the GCKS to not be a single device in the network, instead it is desirable to have a network of GCKS devices that all cooperate to establish GSAs with CEs. For CE-based VPNs employing group security using GCKS, no configuration needs to be done for CE-to-CE VPN tunnels. Instead a single, per-VPN configuration is to be defined between each CE and the GCKS 102. In the embodiment of FIG. 1, each CE device includes a protected control channel 108 to the GCKS 102.

FIG. 1 also shows a SP network 104 including a plurality of SP devices (not shown) and SP routes 110 between the SP devices (not shown). The address space of the VPN and the address space of the SP network 104 are separate. VPN routes do not make it into the SP devices.

Multiprotocol extensions for Border Gateway Protocol ("MP-BGP") provide an auto-discovery mechanism that allows CE devices to be auto-discovered. Auto-discovery mechanisms other than BGP-based auto-discovery mechanisms are known in the art, such as directory service protocols (e.g., Domain Name Service ("DNS") and RADIUS). A more detailed description of MP-BGP than provided herein can be found in Internet Engineering Task Force ("IETF") Request For Comments ("RFC") 2858, the content of which is hereby incorporated herein by reference. A key objective of auto-discovery is to provide reach-ability information to enable the subnet(s) belonging to a particular CE site to be made reachable to other geographically dispersed sites of the VPN. However, providing reach-ability information is insufficient to guarantee the performance of real-time applications. For example, there is an increasing use of IP as the transport mode for voice applications and it is well known that voice applications are susceptible to delay and delay jitter variables. Accordingly, voice applications generally require a higher QoS than many other applications so as to reduce, if not eliminate, delays and delay jitters.

The present invention can utilize auto-discovery mechanisms to enable QoS routing to CE devices belonging to a particular CE-based VPN. CE devices of the present invention are enabled to make more judicious routing decisions than CE devices of the prior art, particularly for applications where more stringent QoS guarantees are required. In preferred embodiments of the present invention, the auto-discovery mechanisms are provided by utilizing MP-BGP. In the CE-based VPN 100 the auto-discovery is made secure by executing it over secure channels 108 established using GSA.

The present invention allows CE devices in a CE-based VPN to route along paths of minimal costs. It is herein assumed that cost may be any parameter that has additive property. That is, the total cost of a path is the sum of the cost metric along the links of that path. The cost metric could represent any QoS metric based on the traffic-engineering objective. A common metric that is frequently employed by default is the hop count. To enable real-time applications, the cost metric may be a more resource-aware metric like delay or bandwidth.

Referring to FIG. 1, CE1, CE2, and CE3 belong to a single CE-based VPN 100. If each of the subnets may be located at different geographical sites and has only a single next-hop option through the core network 104, then there is no ambiguity to choose the next hop. If the network topology offers a choice for the next hop, then it would be better to choose the path which would minimize the cost to the remote destination. For example, if CE1 (i.e., a source CE) in the CE-based VPN 100 wishes to route to the subnet s2 (i.e., a destination subnet) along a best-cost path, CE1 must determine which next hop (i.e., CE2 or CE3) to route through. The cost of a route from CE1 to subnet s2 is the sum of the cost of the path from the source CE (e.g., CE1) to the next hop (e.g., CE2 or CE3) plus the cost of the path from the next hop to the subnet (e.g., s2). The cost of a path from a source CE to a next-hop CE is referred to herein as a CE-to-CE cost and the cost of a path from a next-hop CE to a destination subnet is referred to herein as a CE-to-subnet cost. The sum of a CE-to-CE cost to reach a next-hop CE plus a CE-to-subnet cost from the next-hop CE to a destination subnet is referred to herein as a total-cost.

In deciding between a plurality of next-hop CEs in a path from a source CE to a destination subnet, CE-to-CE costs, CE-to-subnet costs, and total-costs are associated with each of the next-hop CEs. These associated total-costs are used to determine the next-hop CE to be used in a path from the source CE to the destination subnet. In one embodiment, the least of all the associated total-costs is determined and referred to herein as a best-cost. In this embodiment, the next-hop CE that is associated with the best-cost is referred to herein as the best-cost next-hop in a path from the source CE to the destination subnet. The best-cost next-hop can be used as the next hop in the path. However, the present invention also contemplates using next-hop CEs other than the best-cost next-hop CE as the next-hop in the path. For example, if there are a plurality of total-costs that are very close in value, the CE device may choose a next-hop that is not associated with the least of all total-costs but is associated with a total-cost that is sufficiently low. This scenario may be important, for example, if there is a predetermined maximum acceptable total-cost for a path between a source CE and a destination subnet and any total-cost lower than the maximum acceptable total-cost would be considered sufficiently low. In this example, the next-hop can be chosen from the plurality of next-hop CEs associated with sufficiently low total-costs based on any other desirable characteristic of the associated next-hop CEs.

One of the short comings of a CE-based VPN is the lack of topology information of the core network 104. Thus, in embodiments of the present invention, a CE device may have little or no information about the cost of traversing the core network between two CE devices. This presents two scenarios. In the first scenario, there is some amount of topology information available to the CE node which it could use for path computation. And in the second scenario, there is no topology information made available at all.

With respect to the first scenario, it is assumed that the service provider has some knowledge of the CE devices and the VPN to which they belong. The service provider can provide a CE device with a cost matrix. Of course, a data structure other than a matrix can also be used. In one example, a matrix M is provided with each element, C(u, v), in the matrix M being the cost to go from node u to node v, where u and v are CE devices of a single VPN. With respect to FIG. 1, the matrix M could appear as follows:

$$M = \begin{vmatrix} C(1,1) & C(1,2) & C(1,3) \\ C(2,1) & C(2,2) & C(2,3) \\ C(3,1) & C(3,2) & C(3,3) \end{vmatrix}$$

In matrix M, 1, 2, and 3 represent CE1, CE2, and CE3, respectively. Thus, C(1, 2) represents the CE-to-CE cost of traversing the core network 104 from CE1 to CE2 through channel 106A and C(1, 3) represents the CE-to-CE cost of traversing the core network 104 from CE1 to CE3 through channel 106A. If a CE device has multiple channels to the service provider's network, the CE device would receive multiple cost matrices. For example, in FIG. 1, CE1 has two channels 106A, 106B to the core network 104, so CE1 would receive two cost matrices: M as described above and M', wherein each element C'(u, v) of M' is the cost to go from node u to node v through channel 106B, where u and v are CE devices of a single VPN. Similarly, C'(1, 2) represents the CE-to-CE cost of traversing the core network 104 from CE1 to CE2 through channel 106B and C'(1, 3) represents the CE-to-CE cost of traversing the core network 104 from CE1 to CE3 through channel 106B.

In these embodiments, each CE device includes the CE-to-CE costs for traversing a service provider's network from a source CE to a next-hop CE. These CE-to-CE costs are associated with the corresponding next-hop CE. With respect to FIG. 1, CE1 would include C(1, 2) as a CE-to-CE cost of traversing the core network 104 from the source CE (i.e., CE1) to the next-hop CE2. Similarly, CE1 would also include C'(1, 2) as a second CE-to-CE cost of traversing the core network 104 from the source CE (i.e., CE1) to the next-hop CE2. Both CE-to-CE costs (i.e., C(1, 2) and C'(1, 2)) are associated with the next-hop CE (i.e., CE2). Similarly, CE1 includes C(1, 3) and C'(1, 3), which are the CE-to-CE costs associated with CE3. Matrices such as M and M' can be provided by the SP as a service.

The present invention also includes embodiments comprising the second scenario, in which CE-to-CE costs are not provided by the service provider. In these embodiments, a worst-case cost for traversing the core network can be used as a CE-to-CE cost. One method for determining a worst-case cost of traversing a core network from one CE to another CE is to employ probing techniques. Another method for determining a worst-case cost of traversing a core network from one CE to another CE is to assume a constant cost.

One example of employing a probing technique to determine a worst-case cost between any two CE devices, where the cost is a delay metric, is to use a simple ping or trace-route to find an upper bound (i.e., worst-case cost). Employing a probing technique for every pair of CE devices would allow each CE device to build cost matrices, such as the cost matrices M and M' discussed above. As discussed above, each CE device could build a cost matrix for each connection the CE device has with the core network.

The present invention also includes embodiments, wherein probing techniques are undesirable, inappropriate, unavailable, etc. In these embodiments, a constant cost for traversing the core network can be assumed. In one embodiment, the constant cost is the worst-case cost for traversing the core network between any two subnets. This constant cost is used as the CE-to-CE cost associated with each next-hop CE.

CE-to-subnet costs are also associated with next-hop CEs. With respect to FIG. 1, if CE1 is the source CE, then CE2 and CE3 are determined to be the next-hops and x1 and x2 are the CE-to-subnet costs. x1 is associated with CE2 and x2 is associated with CE3. Within a site, these costs could normally be obtained from an Interior Gateway Protocol that is used for routing in that particular site. The BGP that is used for auto-discovery in a CE-based VPN can be used to exchange these costs among the CE devices. The cost information can be included as part of the Network Layer Reachability Information which forms part of MP-BGP. Each CE device associates the received CE-to-subnet costs with the corresponding next-hop CE. For example, CE1 in FIG. 1 associates x1 with CE2 and associates x2 with CE3.

Total-costs for traversing paths from a source CE to a destination subnet are associated with next-hop CEs. A total-cost is obtained by adding a CE-to-CE cost associated with a next-hop CE to a CE-to-subnet cost associated with the same next-hop CE. For the embodiment in FIG. 1, two total-costs are associated with each next-hop CE if CE1 is the source CE. For CE2, the first total-cost is the sum of C(1, 2) and x1. The second total-cost associated with CE2 is the sum of C'(1, 2) and x1. Similarly, the first total-cost associated with CE3 is the sum of C(1, 3) and x2. The second total-cost associated with CE3 is the sum of C'(1, 3) and x2.

The best-cost next-hop becomes the next-hop CE that is associated with the lowest total-cost. For example, in the embodiment discussed above relative to FIG. 1, wherein CE1 is the source CE, there are four total-costs as listed below:

Total-cost-1=C(1, 2)+x1
Total-cost-2=C'(1, 2)+x1
Total-cost-3=C(1, 3)+x2
Total-cost-4=C'(1, 3)+x2

If either Total-cost-1 or Total-cost-2 is the lowest cost of the four, then CE2 is the best-cost next-hop in a path from CE1 to subnet s2. Similarly, if either Total-cost-3 or Total-cost-4 is the lowest cost of the four, then CE3 is the best-cost next-hop. If two or more total-costs are equally low, then there may be more than one best-cost next-hop for the source CE to choose from. For example, if Total-cost-1 and Total-cost-3 are equal and both are lower than Total-cost-2 and Total-cost-4, then both Total-cost-1 and Total-cost-3 are best-costs and both CE2 and CE3 are best-cost next-hops.

Embodiments of the present invention comprise operable logic configured to perform methods of the present invention. These methods may include, for example, creating and updating matrices, tables, etc., such as cost matrices. These methods may also include, for example, associating costs with next-hop CEs or methods for implementing various networking protocols such as MP-BGP. In other words, the operable logic executes the methods of the present invention. Portions of the operable logic may reside in CE devices and portions of the operable logic may reside in a GCKS device or a network of GCKS devices.

The operable logic of the present invention can be implemented as a set of computer program instructions that are stored in a computer-readable medium and executed by an embedded microprocessor system within devices made in accordance with the present invention. Embodiments of the invention may be implemented, in whole or in part, in any conventional computer programming language. For example, preferred embodiments may be implemented in a procedural programming language (for example, "C") or an object oriented programming language (for example, "C++"). Alternate embodiments of the invention may be implemented, in whole or in part, utilizing discrete components, integrated circuitry, programmable logic used in conjunction with a programmable logic device such as a Field Programmable Gate Array (FPGA) or microprocessor, or any other means including any combination thereof. Additional embodiments of the invention may be implemented, in whole or in part, as a computer program product for use with a computer system. Such implementation may include a series of computer instructions fixed either on a tangible medium, such as a computer-readable media (for example, a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality described herein with respect to the present invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over a network (for example, the Internet or World Wide Web).

In accordance with the present invention, novel CE devices and novel routing methods are provided for CE-based VPNs. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A method for determining a next-hop in a path from a source customer edge device ("source CE") of a CE-based Virtual Private Network ("VPN") through a service provider (SP) network to a destination subnet of the CE-based VPN, the CE-based VPN being unknown to any SP device of the SP network in the path handling traffic of the CE-based VPN, the method comprising:
    associating one or more CE-to-CE costs with each next-hop CE in a plurality of next-hop CEs, each CE-to-CE cost being a cost of a path from the source CE of the CE-based VPN to one of the associated next-hop CEs;
    associating one or more CE-to-subnet costs with each of the next-hop CEs, each CE-to-subnet cost being a cost of a path from one of the associated next-hop CEs to the destination subnet;
    associating one or more total-costs with each of the next-hop CEs, each total-cost being a sum of a CE-to-CE cost associated with next-hop CE and a CE-to-subnet cost associated with the same next-hop CE;
    setting a next-hop in a path through the SP network from the source CE to the destination subnet to be a next-hop CE associated with an associated total-cost; and
    automatically discovering CEs using an auto-discovery mechanism via Multiprotocol extensions for Border Gateway Protocol ("MP-BGP"), wherein the auto-discovery mechanism is executed over secure control channels established using a unique Group Security Association ("GSA"), wherein the CE-based VPN includes at least a portion of the CEs that lack DiffServ capability, wherein setting the next-hop in the path through the SP network to be the next-hop CE associated with the associated total-cost comprises setting the next-hop in the path from the source CE to the destination subnet of the CE-based VPN, wherein associating one or more total-costs with each of the next-hop CEs comprises the associated total cost being a sum of a cost metric representing delay along links of a path.

2. The method of claim 1, wherein the set next-hop is a next-hop CE associated with the least of all associated total costs.

3. The method of claim 1, wherein CE-to-CE costs, CE-to-subnet costs, and total-costs are delay metrics.

4. The method of claim 1, wherein associating one or more CE-to-subnet costs comprises executing the auto-discovery mechanism via the MP-BGP.

5. The method of claim 1, wherein associating one or more CE-to-CE costs comprises receiving topology information from a service provider.

6. The method of claim 1, wherein each associated CE-to-CE cost is a worst cost, wherein associating one or more CE-to-CE costs comprises employing a probing technique.

7. The method of claim 1, wherein each associated CE-to-CE cost comprises a single constant-cost, wherein the constant-cost is a worst-case cost for traversing paths between any two CEs in the CE-based VPN.

8. The method of claim 1, further comprising:
    receiving a cost matrix from an SP device at a given CE, the cost matrix representing costs to transmit data from one CE to another CE within the CE-based VPN, wherein each CE includes CE-to-CE costs for traversing the SP network from the source CE to a next-hop CE;
    identifying a predetermined maximum acceptable total-cost for a path between the source CE and the destination subnet; and identifying multiple next-hop CEs, each next-hop CE of the multiple next-hop CEs having a total-cost below the predetermined maximum acceptable total-cost of the path between the source CE and the destination subnet, the multiple next-hop CEs including one CE having a least total-cost, wherein setting a next-hop in a path includes selecting a next-hop CE from the multiple next-hop CEs, having a total-cost below the predetermined maximum acceptable total cost of the path between the source CE and the destination subnet, other than the one CE having the least total-cost, wherein the CE-based VPN establishes a secure key management channel and a secure control channel using a group controller/key server and a single Internet Protocol Security ("IPSec") Security Association ("SA") for site-to-site communication.

9. The method of claim 1, further comprising identifying a worst-case cost, for traversing core network as a CE-to-CE cost, by traversing the core network from one given CE to another given CE using a probing technique that determines the worst-case cost between two given CEs, the probing technique using a trace-route to find an upper bound worst-case cost; and building a cost matrix using the probing technique for pairs of CEs so that each CE builds a respective cost matrix for each connection a given CE has with the core network, wherein the next-hop CE associated with the associated total-cost is a next-hop CE associated with a least of all associated total costs, the least of all associated total costs being a minimal-cost path from the source CE to the destination subnet, wherein the CE-based VPN establishes a secure key management channel and a secure control channel using a group controller/key server and a single Internet Protocol Security ("IPSec") Security Association ("SA") for site-to-site communication.

10. The method of claim 1, further comprising:

identifying a worst-case cost, for traversing core network as a CE-to-CE cost, by traversing the core network from one given CE to another given CE being a constant cost, the constant cost being a worst-case cost for traversing the core network between two given subnets, the constant cost being used as a CE-to-CE cost associated with each next-hop CE, to build a cost matrix, wherein the next-hop CE associated with the associated total-cost is a next-hop CE associated with a least of all associated total costs, the least of all associated total costs being a minimal-cost path from the source CE to the destination subnet; and, wherein the CE-based VPN establishes a secure key management channel and a secure control channel using a group controller/key server and single Internet Protocol Security ("IPSec") Security Association ("SA") for site-to-site communication.

11. A source customer edge device ("source CE") of a CE-based Virtual Private Network ("VPN") in communication with a service provider (SP) network that carries traffic of the CE-based VPN from the source CE to a destination subnet of the CE-based VPN, the CE-based VPN being unknown to any SP device of the SP network in a path handling traffic of the CE-based VPN, the source CE comprising:

a microprocessor; and a memory coupled to the processor, the memory storing instructions that, when executed by the processor, cause the source CE to perform the operations of:

associating one or more CE-to-CE costs with each next-hop CE in a plurality of next-hop CEs, each CE-to-CE cost being a cost of a path from the source CE to one of the associated next-hop CEs;

associating one or more CE-to-subnet costs with each of the next-hop CEs, each CE-to-subnet cost being a cost of a path from one of the associated next-hop CEs to the destination subnet;

associating one or more total-costs with each of the next-hop CEs, each total-cost being a sum of a CE-to-CE cost associated with a next-hop CE and a CE-to-subnet cost associated with the same next-hop CE;

setting a next-hop in a path through the SP network from the source CE to the destination subnet to be a next-hop CE associated with an associated total-cost; and automatically discovering CEs using an auto-discovery mechanism via Multiprotocol extensions for Border Gateway Protocol ("MP-BGP"), wherein the auto-discovery mechanism is executed over secure control channels established using a unique Group Security Association ("GSA"), wherein the CE-based VPN includes at least a portion of the CEs that lack Diff-Serv capability, wherein setting the next-hop in the path through the SP network to be the next-hop CE associated with an associated total-cost comprises setting the next-hop in the path from the source CE to the destination subnet of the CE-based VPN, wherein associating one or more total-costs with each of the next-hop CEs comprises the associated total cost being a sum of a cost metric representing delay along links of a path.

12. The source customer edge device of claim 11, wherein the set next hop is a next-hop CE associated with the least of all associated total costs.

13. The source customer edge device of claim 11, wherein CE-to-CE costs, CE-to-subnet costs, and total-costs are delay metrics.

14. The source customer edge device of claim 11, wherein associating one or more CE-to-subnet costs comprises executing the auto-discovery mechanism via the MP-BGP.

15. The source customer edge device of claim 11, wherein associating one or more CE-to-CE costs comprises receiving topology information from a service provider.

16. The source customer edge device of claim 11, wherein each associated CE-to-CE cost is a worst cost, wherein associating one or more CE-to-CE costs comprises employing a probing technique.

17. The source customer edge device of claim 11, wherein each associated CE-to-CE cost comprises a single constant-cost, wherein the constant-cost is a worst-case cost for traversing paths between any two CEs in the CE-based VPN.

18. A customer edge (CE)-based Virtual Private Network ("VPN"), comprising:

a plurality of customer edge devices ("CEs") in communication with a service provider (SP) network that carries traffic of the CE-based VPN, the CE-based VPN being unknown to any SP device of the SP network in a path carrying the traffic of the CE-based VPN;

a destination subnet; and at least one source CE comprising:

a microprocessor; and a memory coupled to the processor, the memory storing instructions that, when executed by the processor, cause the at least one source CE to perform the operations of:

associating one or more CE-to-CE costs with each next-hop CE in a plurality of next-hop CEs, each CE-to-CE cost being a cost of a path from the at least one source CE to one of the associated next-hop CEs;

associating one or more CE-to-subnet costs with each of the next-hop CEs, each CE-to-subnet cost being a cost of a path from one of the associated next-hop CEs to the destination subnet;

associating one or more total-costs with each of the next-hop CEs, each total-cost being a sum of a CE-to-CE cost associated with a next-hop CE and a CE-to-subnet cost associated with the same next-hop CE;

setting a next-hop in a path through the SP network from the at least one source CE to the destination subnet to be a next-hop CE associated total-cost; and automatically discovering CEs using an auto-discovery mechanism via Multiprotocol extensions for Border Gateway Protocol ("MP-BGP"), wherein the auto-discovery mechanism is executed over secure control channels established using a unique Group Security Association ("GSA"), wherein the CE-based VPN includes at least a portion of the CEs that lack Diff-Serv capability, wherein setting the next-hop in the path through the SP network to be the next-hop CE associated with the associated total-cost comprises setting the next-hop in the path from the at least one source CE to the destination subnet, wherein associating one or more total-costs with each of the next-hop CEs comprises the associated total cost being a sum of a cost metric representing delay along links of a path.

19. The VPN of claim 18, wherein associating one or more CE-to-subnet costs comprises executing the auto-discovery mechanism via the MP-BGP.

* * * * *